Figure 1:
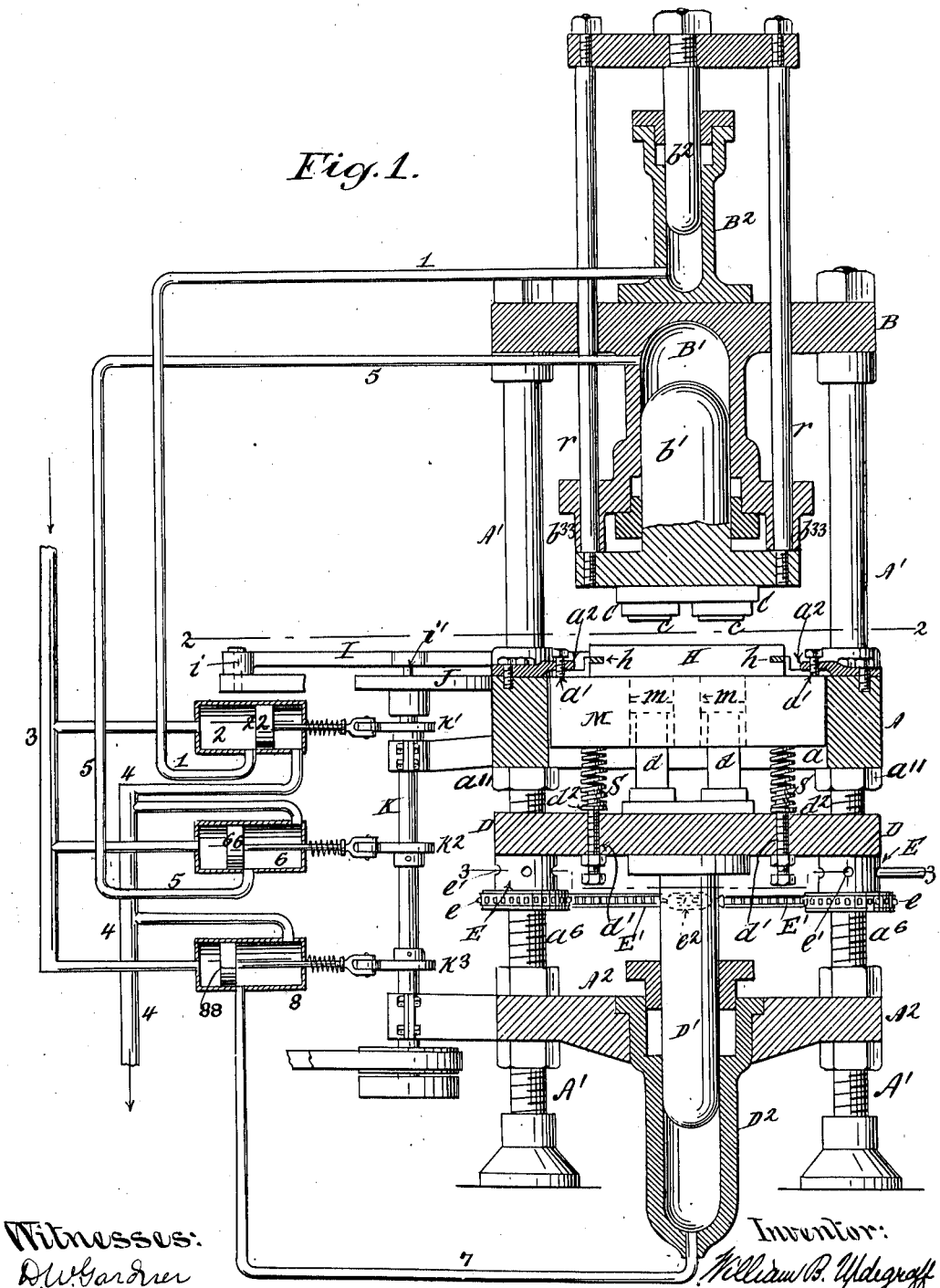

W. B. UPDEGRAFF.
PRESS FOR PLASTIC MATERIAL.
APPLICATION FILED NOV. 28, 1910.

989,211.

Patented Apr. 11, 1911.

3 SHEETS—SHEET 1.

Witnesses:
D. W. Gardner
Lillia Miatt

Inventor:
William B. Updegraff
By his Attorney
Geo. F. Miatt

W. B. UPDEGRAFF.
PRESS FOR PLASTIC MATERIAL.
APPLICATION FILED NOV. 28, 1910.
989,211.
Patented Apr. 11, 1911.
3 SHEETS—SHEET 2.
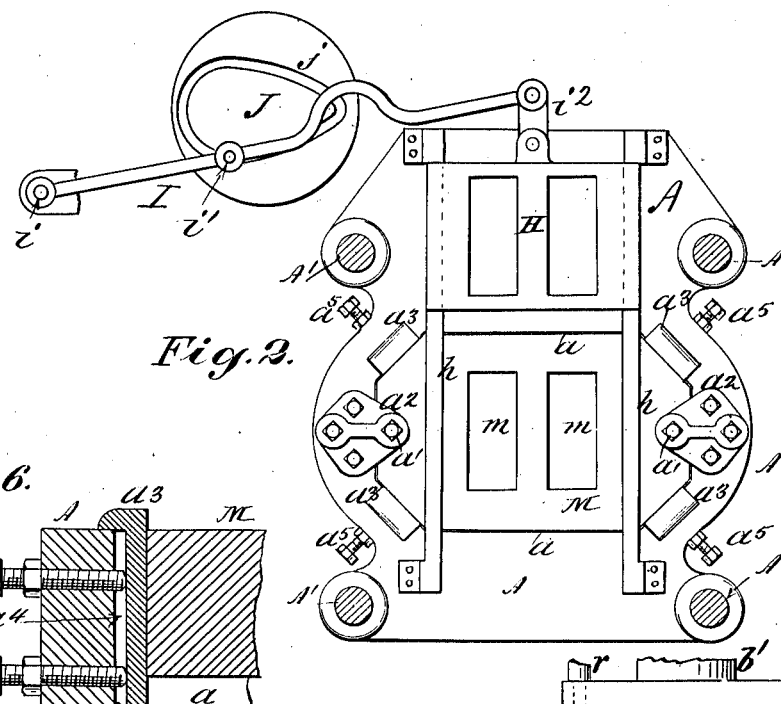
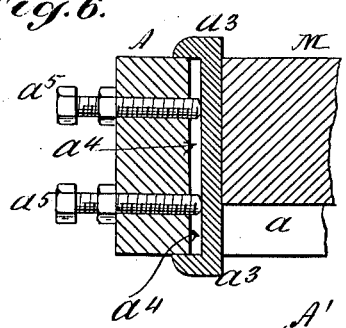
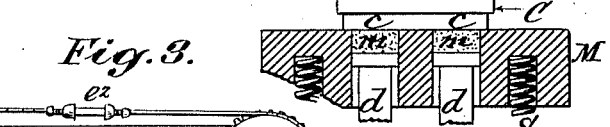
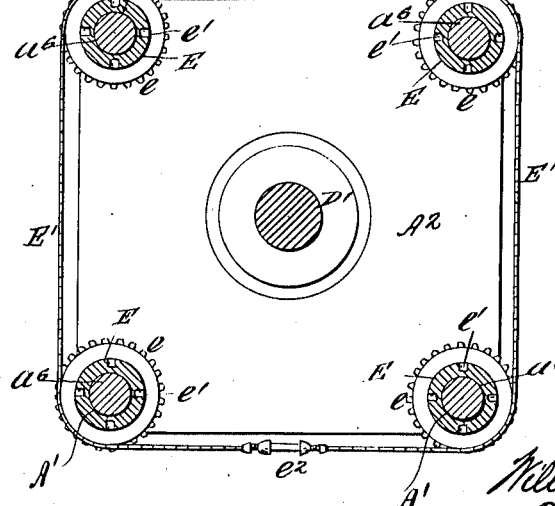
Witnesses:
D. W. Gardner.
Lillia Miatt.
Inventor:
William B. Updegraff
By his Attorney
Leo. Wm Miatt W. B. UPDEGRAFF.
PRESS FOR PLASTIC MATERIAL.
APPLICATION FILED NOV. 28, 1910.
989,211.
Patented Apr. 11, 1911.
3 SHEETS—SHEET 3.
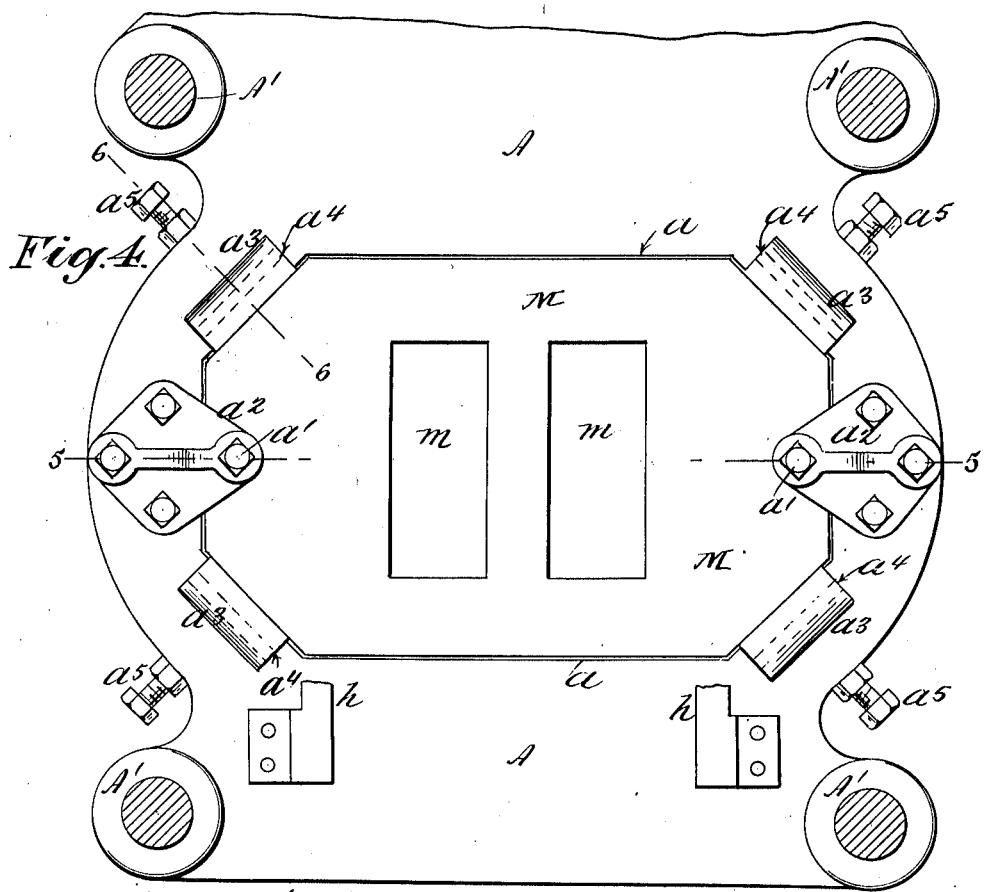
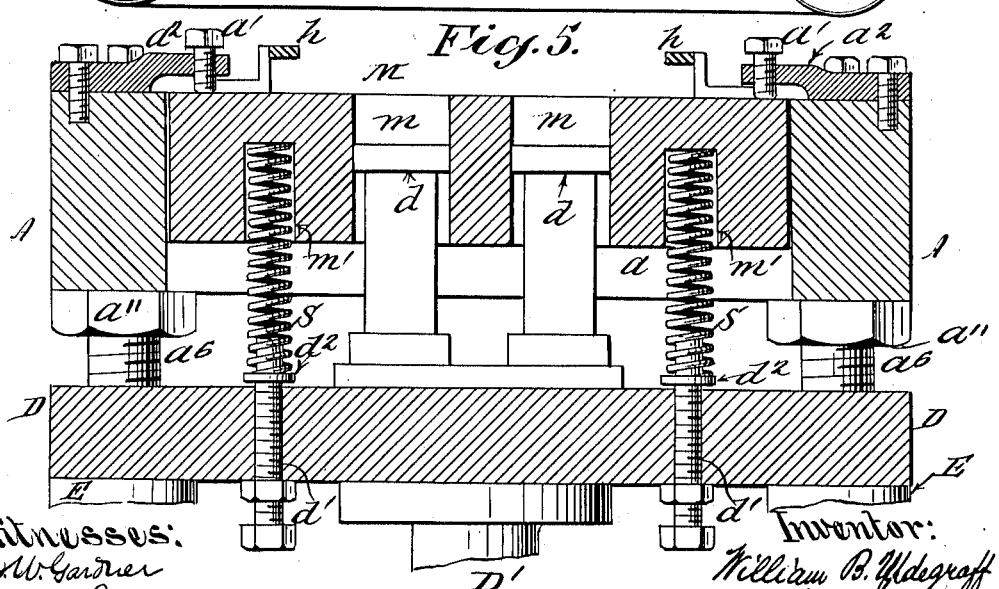

UNITED STATES PATENT OFFICE.

WILLIAM B. UPDEGRAFF, OF NEW YORK, N. Y.

PRESS FOR PLASTIC MATERIAL.

989,211.

Specification of Letters Patent. Patented Apr. 11, 1911.

Application filed November 28, 1910. Serial No. 594,527.

*To all whom it may concern:*

Be it known that I, WILLIAM B. UPDEGRAFF, a citizen of the United States, residing in the borough of Manhattan, city, county, and State of New York, have invented certain new and useful Improvements in Presses for Plastic Material, of which the following is a specification.

My present improvements relate to a fluid pressure press, the general features of which are shown and described in my concurrent application filed March 28th, 1910, Serial No. 551,904, the press being designed for use in the manufacture of articles from plastic, compressible material, such as bricks, tiles, &c.

The main object of the invention is to effect the compression of the plastic material in the extreme upper portion of the mold immediately adjacent to the plane of discharge,—*i.e.* the plane of the upper surface of the mold block,—and this I accomplish by the use of a yielding mold block substantially in the manner hereinafter set forth.

In practice the inner surfaces of the mold exposed to the lateral strain resulting from the compression of the material under treatment are gradually worn away by attrition, increasing the width of the mold or matrix in such area of compression, so that after a time the article molded has to be forced out through a relatively narrow passage representing the original cross section of the mold, but contracted as compared with said area of compression. As a result the shape of the molded object is distorted more or less, and in the case of tile particularly if not actually buckled so as to be useless is warped, and bent to an extent that impairs the value of the finished tile. Hence, obviously, if the compression of material can be effected immediately at the mouth of the matrix. or practically so, the article molded can be ejected directly from the mold without contraction or distortion; and this I have accomplished by mounting and supporting the mold block in such manner that it yields under the pressure of the upper die block so that the area of compression is immediately below the mouth of the mold and between it and the face of the lower die held stationary during the operation of compression,—the subsequent elevation of the lower die lifting the molded object out of the mouth of the mold. In this connection my present invention includes means for centralizing the yielding mold block with accuracy, and for compensating for wear caused by the movement thereof, as hereinafter described.

Still another feature of my invention, consists in supporting the yielding mold block on the same support as that of the lower die block (which is used to extract the molded article) by means which not only allow the mold block to recede under pressure of the upper die block but also maintain its contact therewith during the retractile movement of the upper die block and until the mold block returns to its normal position, after which the molded object is ejected from the mold by the lower die, the upper die block holding and supporting the molded object firmly from above during such extraction, thereby maintaining the shape of the molded object.

My invention also includes the specific means employed for simultaneously adjusting the stop rests upon which the lower die block is supported during the compressing operation, such means being an improvement upon the means described and claimed in my concurrent application hereinbefore referred to.

Finally my invention includes the mechanism by which the conveyer is forwarded and retracted, and other features described and claimed specifically.

In the accompanying drawings, Figure 1, is a central vertical sectional elevation showing sufficient of the operative parts of the press to illustrate the practical application of my invention; Fig. 2, is a horizontal section taken upon plane of line 2—2. Fig. 1; Fig. 3, is a horizontal section taken upon plane of line 3—3. Fig. 1; Fig. 4, a plan upon an enlarged scale of the yielding molding block and adjacent parts; Fig. 5, is a sectional elevation taken upon plane of line 5—5 Fig. 4; Fig. 6, is a sectional detail taken upon plane of line 6—6 Fig. 4. Fig. 7, is a section of the yielding mold block, with adjacent parts in elevation, showing the upper die block formed with a non-protruding die face common to both matrices in said yielding mold block.

As in my said concurrent application, the stationary work table A, is supported on standards A′, A′, attached to a bed plate A², and resting on a suitable foundation. The standards A′, A′, extend above the work table A, the cross head B, being rigidly secured to their upper extremities. The cross head B, in turn supports the main pressure cylinder B′, and the pull back cylinder B², the latter being of relatively small diameter as is also the plunger $b^2$, as compared with the main plunger $b′$. These two plungers $b′$, $b^2$, are rigidly linked together by tie rods $r$, $r$.

The upper die block C, is mounted upon the lower end of the main plunger $b′$, and is preferably though not necessarily formed with die faces $c$, $c$, which project but slightly below the lower surface of the body of the block, so that they protrude, say, for from one thirty second to one sixteenth of an inch into the molds $m$, $m$, when the main plunger $b′$, is lowered, the object of such protrusion of the die faces being simply to seal the mold against the escape of the material therein under treatment without interfering materially with the escape from the mold of air or moisture released from the material under compression.

The upper thrust of the plungers $b′$, $b^2$, is limited and the highest position of the upper die block is prescribed by stops $b^{33}$, $b^{33}$, arranged on any stationary part, as for instance, the lower ends of the sleeve bearings on the cross head B, through which the tie rods $r$, $r$, pass.

The work table A, is formed with the central elongated recess $a$, for the reception of the yielding mold block M, the top of which, in its normal raised position, is flush with the top of the work table A, the alinement of the two surfaces being effected with accuracy by means of adjustable rests $a′$, $a′$, on the top of the work table against which the top of the mold block M, is held by the springs S, S, or their equivalent, except when the mold block M, is depressed by the upper die block as hereinafter set forth. The stop rests $a′$, $a′$, may be of any desired form and construction, those shown in the drawings consisting of screws passing through the overhanging arms of the stop blocks $a^2$, $a^2$, secured to the work table A.

The mold block M, having vertical play and motion, it is most important that it be centralized and guided with accuracy with relation to both the upper and the lower die blocks, and also that provision be made for compensating for wear: For these reasons I provide gib plates $a^3$, $a^3$, arranged to bear against the ends of the yielding mold block M, and to act as guides therefor. Preferably four of these gib plates $a^3$, are used as shown in the drawings,—two at each end of the mold block M, their faces and those of the edges of the mold block with which they contact being set at an angle with relation to the longitudinal center of the mold block, so as to provide for both the longitudinal and the lateral horizontal adjustment of the mold block. They are in effect adjustable guide plates which insure the vertical alinement of the mold block M, and may be utilized to compensate for wear; and for this reason I do not wish to confine myself to the identical form and construction of gib plates shown, which are seated in recesses $a^4$, $a^4$, formed for their reception in the inner edges of the work table A, and are backed with set screws $a^5$, $a^5$, engaging with the table A, as will be seen more particularly by reference to Fig. 6. Obviously any well known mechanical expedient for guiding and centralizing the mold block M, and compensating for wear, may be substituted without departing from the spirit and intent of my invention in this respect.

The under side of the depressible mold block M, is formed with recesses $m′$, for the seating of the upper ends of the sustaining springs S. The lower ends of these sustaining springs are supported either on extensions on the lower side of the table A, or other stationary part of the apparatus, or preferably upon the support for the lower dies $d$, $d$, which in the construction shown in the accompanying drawings consists of the cross head D, attached to the plunger D′, the lower portion of which latter rests in what is designated as the extracting cylinder D², by means of which the plunger D′, and cross head D, are raised by fluid pressure to force the compressed plastic material from the molds $m$, $m$.

By seating the lower ends of the sustaining springs S, S, on the cross head D, I accomplish a two fold purpose:—First, the springs S, S, perform the double function of both pressing the mold upward against its stops (or against the upper dies, when the same are in contact with the mold) and secondly of assisting gravity by pressing down on the lower die support, thereby increasing the pressure on the fluid in the extractor cylinder D² during discharge of said fluid therefrom,—thus accelerating the action.

The lower ends of the sustaining springs S, S, are preferably seated on adjustable bearing plates $d^2$, $d^2$, resting on screws $d′$, $d′$, the upper ends of which protrude above the bearing plates $d^2$, $d^2$, and act as stud bearings for preserving the alinement of said lower extremities of the springs. By this means the tension of the springs S, S, may be varied to suit the requirements of use.

When in its prescribed lowest position the cross head D, rests upon supporting stops E, E, E, E, which are adjustable vertically for the purpose of regulating the depth of the molds $m$, $m$, (of which the faces of the lower dies $d$, $d$, form the bottoms) and hence the capacity of the molds. In accomplishing this in the structure shown in the drawings, I dispense with the suspending screws, worm shaft and gears described and claimed in my aforesaid concurrent application and use a simpler device. That is to say supporting nut rests E, E, E, E, engage the screws $a^6$, $a^6$, on the standards A′, A′, and are provided with sprocket teeth $e$, $e$, with which an endless sprocket chain E′, engages, coupling the rest nuts E, E, E, E, together so that they all turn simultaneously when one is moved. One or more of the rest nuts E, E, E, E, may be formed with radial sockets $e'$, $e'$, for the insertion of a hand lever by means of which the nuts may be turned to effect the required adjustment. One or more adjustable connections, as for instance a turn buckle $e^2$, may be interposed in said sprocket chain, for the purpose of keeping the same taut, and for adjusting the rest nuts to make a perfectly level bearing for the cross head D.

The upward thrust of the extracting plunger D′, and cross head D, is limited by stops $a''$, $a''$, which insure the alinement of the upper surfaces of the lower dies $d$, $d$, with the plane of the surfaces of the mold block M, and the table A, and prevent their projection above the same.

The sustaining springs S, S, upon which the depressible mold block M, rests, may be replaced by any other mechanical expedient adapted to yield, and to also act as means of returning the mold block to its normal, raised position with its upper surface on a level with that of the work table A.

The conveyer box H, by which the plastic material is forwarded and delivered to the molds $m$, $m$, travels in ways $h$, $h$, on the face of the table A, as in my concurrent application, but in the present case it is forwarded and retracted by means of a lever I, fulcrumed at $i$, to a stationary part, and pivotally connected by a link $i^2$ at the other end to the conveyer box. This thrust lever I, is actuated by an intermediate horizontal face cam J, upon the cam and power shaft K,—a roller $i'$, on the under side of the lever engaging with the cam groove $j$, which is so formed as to afford the necessary movements and rests for the conveyer H.

Means for operating the plungers by fluid pressure are shown symbolically and diagrammatically for convenience of illustration in Fig. 1, in which the valves &c. are indicated as in proper relation to each other and to the positions of the other parts of the press. Thus the duct 1, connects the pull back cylinder B² with the valve chamber 2, which is also in communication through suitable ports and ducts with the pressure supply conduit 3, and with the relief or discharge conduit 4. The valve 22, is shown as closing the relief port, so that fluid pressure is exerted against the under side of the auxiliary or pull-back plunger $b^2$. Duct 5 connects the main pressure cylinder B′, with the valve chamber 6, which is also in communication through suitable ports and ducts, with the pressure supply conduit 3, and with the relief conduit 4,—the valve 66, being shown in position to relieve the main plunger $b'$, of pressure. In like manner duct 7, connects the extractor cylinder D², with the valve chamber 8, which is also in communication, through suitable ports and ducts, with the pressure supply conduit 3, and with the relief conduit 4,—the valve 88, in this case being also positioned to relieve the extractor plunger D′, of pressure. The several valves 22, 66, and 88, are operated by cam $k'$, $k^2$, $k^3$, on the power shaft K, each suitably formed and timed with relation to each of the others, to effect the cycle of operations involved in feeding, pressing and discharge, and need not be described specifically in this connection since they represent well known means for operating and controlling the valves.

The term "fluid pressure" is used herein to designate and include any suitable fluid pressure, either liquid or gaseous. It is also to be understood that while I have herein mainly referred to the molding of tiles in the press I do not limit myself to such use, as the improvements herein set forth are applicable to presses for the manufacture of blocks, bricks and various articles molded from plastic or compressible material. Furthermore the term "plastic material" is herein used in a broad sense, as including any compressible moldable material, wet or dry, powdered or adhesive.

The operation of the apparatus is essentially the same as described in my concurrent application hereinbefore referred to, except that the die faces $c$, of the upper die block C, if they project at all from the lower surface of the die block, protrude but slightly into the mouths of the molds $m$, $m$, in the yieldable mold block when the latter is encountered and depressed by said upper die block. In other words, projecting die faces may be dispensed with in connecting with the depressible mold block if desired, since the yielding of the mold block before the downward thrust of the upper die block C, insures the compression of the material in the molds whether the latter are entered or not by the upper die face or faces. The main object, therefore, in using protecting die faces $c$, is to prevent possibility of the escape of material from the molds, and a very slight degree of penetration into the molds is sufficient to thus seal the molds against leakage or escape of material without impeding the escape of air or excess of moisture forced from the material under compression. In either case the descent of the plunger $b'$ under pressure admitted to the cylinder B′, after the retractile movement of the conveyer H, brings the lower face of the upper die block C, in contact with the upper face of the mold block M, and causes the depression of the latter against the resistance of the springs S, S. During the descent of the upper die block C, the lower dies $d$, $d$, cross head D, and plunger D', are stationary, the cylinder D², being relieved of fluid pressure and the cross head D, resting against the stops E, E, E, E. As a result the material in the molds $m$, $m$, is compressed between the upper faces of the lower dies $d$, $d$, and the upper die block C. Provision may be made for two or more compressions if desired, for the purpose of facilitating the elimination of air, or excess of moisture from the material under treatment, and to render the moldings more compact and homogeneous, prior to the beginning of the upward retractile thrust of the extracting plunger D'.

To effect the operation of extracting the molded objects from the molds $m$, $m$, fluid pressure is admitted to the cylinder D², causing the plunger D', cross head D, and lower dies $d$, $d$, to tend to rise before pressure is released in the main upper cylinder B², thus confining and supporting the moldings firmly between the lower dies $d$, $d$, and the upper die block C, during extraction, the weight of the upper die block C, and main plunger $b'$, together with the difference in net upward pressure due to relative proportions of cylinder and pressure, effecting this result after the fluid pressure is released from the main cylinder B'. The mold block M, of course, under the pressure of the springs, S, S, rises with the upper die block C, and lower die block D, and dies $d$, $d$, until it encounters the overhanging stops $a'$ on the table A, which detain it with its upper surface flush with that of the table. The continued rise of the plungers, dies, &c., brings the cross head D, into contact with stops $a''$, $a''$, with the upper faces of the dies $d$, $d$, flush with the upper surface of the mold block M, the moldings thus in the meantime having been extracted from the molds $m$, $m$. The upper die plate C, main plunger $b'$, &c. continue to rise under the action of pressure in the pull-back cylinder B², until held by the stops $b^{33}$, $b^{33}$, by which time the upper die plate C, is above the path of the conveyer H, the latter is reciprocated, and another cycle of operations is begun.

It will readily be seen that the perfect alinement and lateral guidance of the depressible mold block is essential to the successful operation thereof, and hence the adjustable guiding gibs $a^3$, or equivalent mechanical expedients are important factors in my improved press, otherwise the mold block M, would bind upon the lower dies $d$, $d$, causing undue frictional resistance and excessive wear, if nothing worse. Furthermore they provide for compensation for unavoidable wear necessarily involved in the continuous vertical reciprocal movements of the mold block.

The depressible mold block itself I find by practical experience to be an important advance in the state of the art, since a more perfect, uniform product is attained for the reasons hereinbefore stated. This feature of my invention is not necessarily dependent on the means for operating the upper and lower die blocks by fluid pressure as herein shown and described, since it is obvious that in so far as the yielding mold block is concerned, it is adapted to other forms of presses for molding plastic material, in which both the upper and the lower die blocks are movable with relation to each other and to the mold block,—the essential and distinguishing feature in this respect being the utilization of the portion of the mold immediately below its mouth as the matrix in which to compress and form the material under treatment, so that the molded object may be ejected directly from such matrix substantially as herein set forth, whereby the warping or distortion of the object molded is obviated and its integrity insured. As a means to this end, as attaining the perfect alinement and operation of the yielding mold block, the horizontally adjustable vertical guiding and bearing plates on the table of the machine, arranged to contact with opposed vertical bearing surfaces on the edges of the mold block, are important, if not absolutely essential. In this connection it is to be noted that the adjustable rests on the top of the table for contacting with the upper surface of the mold block, aid materially in maintaining the horizontal as well as the vertical alinement of said depressible mold block. Furthermore, the mounting of the yielding mold block on elastic resilient supports, as for instance the springs S, S, or equivalent mechanical expedients, interposed either directly or indirectly between the said yielding mold block, and the lower die block or its support, while not absolutely essential to the use of the yielding mold block, is a most advantageous feature in practice, for the reasons hereinbefore stated, and one which I desire to cover in connection therewith.

The means employed herein for simultaneously turning and adjusting the rests used to support the lower dies during the compression of the material within the mold block is more simple, and just as effective as the means shown in my concurrent application hereinbefore referred to, and enables me to use four such adjustable rests in lieu of two therein shown, thereby attaining a more evenly distributed support and insuring perfect horizontal alinement of the die face or die faces within the mold block.

The mechanism for effecting the advance and retraction of the feed conveyer is also simple and direct, and new in application.

Finally it is to be understood that the nominal protrusion of the upper die face or faces into the mold or molds in the yielding mold block while admissible and desirable under certain conditions of use to a very limited extent, is not essential, and may be dispensed with without materially affecting the result or departing from the spirit and intent of my invention in this respect. For this reason I have, in Fig. 7, shown the upper die block C, formed with a non-protruding face c, common to both the molds m, m, in the yielding mold block M, the lower dies d, d, in such case being correspondingly raised and set for a given thickness of tile or other article to be molded. This is an ideal construction in that the extreme edge or mouth of each mold m, m, forms a part of the matrix in each case; although as a matter of fact in actual use where slightly protruding upper die faces are used, the wear of the latter on the mouth edges of the molds is equal to, or sufficient to compensate for the wear hereinbefore referred to as caused by attrition of material on the inner sides of the molds below the mouth of each mold.

What I claim as my invention and desire to secure by Letters Patent is,

1. In a press for molding plastic material, the combination of a stationary work table, a yielding mold block positioned therein, rests on the stationary work table arranged to stop the said yielding mold block in its normal position with its upper surface in the same plane as that of the stationary work table, a conveyer adapted to feed material to a mold in said yielding mold block, a lower die protruding into said mold, a cross head on which said lower die is mounted, resilient supports tending constantly to return the yielding mold block to its normal position after depression, an extractor plunger connected with said cross head, means for actuating said extractor plunger by fluid pressure, lower stop rests arranged to support said cross head in its lowest position, upper stop rests arranged to limit the upward thrust of the extractor plunger and cross head when the face of the lower die is in the same plane as that of the stationary work table and of the yielding mold block when the latter is in its said normal position, an upper die plate and plunger, and means for operating the same by fluid pressure for the purpose described.

2. In a press for molding plastic material, the combination of a stationary work table, a yielding mold block positioned therein, rests on the stationary work table arranged to stop the said yielding mold block in its normal position with its upper surface in the same plane as that of the stationary work table, a reciprocating conveyer mounted on said stationary table and adapted to feed material to a mold in said yielding mold block, a lower die protruding into said mold, a cross head on which said lower die is mounted, resilient supports interposed between said cross head and the yielding mold block and tending constantly to return the latter to its said normal position after depression, an extractor plunger connected with said cross head, means for actuating said extractor plunger by fluid pressure, lower stop rests arranged to support said cross head in its lowest position, upper stop rests arranged to limit the upward thrust of the extractor plunger and cross head when the face of the lower die is in the same plane as that of the stationary work table and of the yielding mold block when the latter is in its said normal position, an upper die plate and plunger, and means for operating the same by fluid pressure for the purpose described.

3. In a press of the character described, the combination of a stationary work table, a yielding mold block positioned therein and formed with a plurality of molds, rests on the stationary work table arranged to stop the yielding mold block in its normal position with its upper surface in the same plane as that of the stationary work table, a reciprocating conveyer mounted on said stationary table and adapted to feed material to the molds in said yielding mold block, lower dies protruding into the molds in the yielding mold block, a cross head on which said lower dies are mounted, resilient supports interposed between said cross head and the yielding mold block and tending constantly to return the latter to its said normal position after depression, an extractor plunger connected with said cross head, means for actuating said extractor plunger by fluid pressure, lower stop rests arranged to support said cross head in its lowest position, upper stop rests arranged to limit the upward thrust of the cross head when the faces of the lower dies are in the same plane as that of the stationary work table and of the yielding mold block when the latter is in its normal position, an upper die plate and plunger, and means for operating the same by fluid pressure, for the purpose described.

4. In a press for molding plastic material, the combination of a stationary work table, a yielding mold block positioned therein, rests on the stationary table arranged to stop the said yielding mold block in its normal position with its upper surface in the same plane as that of the stationary work table, a lower die protruding into a mold in said yielding mold block, a cross head on which said lower die is mounted, supporting springs interposed between said cross head and the yielding mold block and tending constantly to return the latter to its normal position after depression, adjustable bearing plates on said cross head for the lower ends of the said supporting springs, stop rests for said cross head, a plunger connected with the latter, means for actuating said plunger by fluid pressure, an upper die plate and plunger, and means for operating the same by fluid pressure for the purpose described.

5. In a press for molding plastic material, the combination of a stationary work table, a yielding mold block positioned therein, rests on the stationary work table arranged to stop the said yielding mold block in its normal position with its upper surface in the same plane as that of the stationary work table, a reciprocating conveyer mounted on said stationary work table and adapted to feed material to a mold in said yielding mold block, a lower die protruding into a mold in said yielding mold block, a cross head on which said lower die is mounted, supporting springs interposed between said cross head and the yielding mold block and tending constantly to return the latter to its normal position after depression, means for adjusting the tension of said supporting springs, stop rests for said cross head, a plunger connected with the latter, means for actuating said plunger by fluid pressure, an upper die plate and plunger, and means for operating the same by fluid pressure, for the purpose described.

6. In a press for molding plastic material, the combination of a stationary work table, a yielding mold block positioned therein and formed with oblique vertical surfaces at its extremities, guide plates mounted adjustably on said stationary work table and contacting with said oblique vertical surfaces on the yielding mold block, rests on the stationary work table arranged to stop the said yielding mold block in its normal position with its upper surface in the same plane as that of the stationary work table, a reciprocating conveyer mounted on said stationary work table and adapted to feed material to a mold in said yielding mold block, a lower die projecting into a mold in said yielding mold block, a cross head on which said lower die is mounted, resilient supports interposed between said cross head and the yielding mold block and tending constantly to return the latter to its said normal position after depression, an extractor plunger connected with said cross head, means for actuating said extractor plunger by fluid pressure, lower stop rests arranged to support said cross head in its lowest position, upper stop rests arranged to limit the upward thrust of the cross head when the face of the lower die is in the same plane as that of the stationary work table and of the yielding mold block when the latter is in its normal position, an upper die plate and plunger, and means for operating the same by fluid pressure for the purpose described.

7. In a press for molding plastic material, the combination of a stationary work table, a yielding mold block positioned therein and formed with oblique vertical surfaces at its extremities, guide plates mounted adjustably on said stationary work table and contacting with said oblique vertical surfaces on the yielding mold block, adjustable rests arranged to stop the said yielding mold block in its normal position with its upper surface in the same plane as that of the stationary work table, a reciprocating conveyer mounted on said stationary work table and adapted to feed material to a mold in said yielding mold block, a lower die projecting into a mold in said yielding mold block, a cross head on which said lower die is mounted, resilient supports interposed between said cross head and the yielding mold block and tending constantly to return the latter to its said normal position after depression, an extractor plunger connected with said cross head, means for actuating said extractor plunger by fluid pressure, lower stop rests arranged to support said cross head in its lowest position, means for simultaneously adjusting said lower stop rests, upper stop rests arranged to limit the upward thrust of the cross head when the face of the lower die is in the same plane as that of the stationary work table and of the yielding mold block when the latter is in its normal position, an upper die plate and plunger, and means for operating the same by fluid pressure for the purpose described.

8. In a press for molding plastic material, the combination of a stationary work table, a yielding mold block positioned therein, rests on the stationary work table arranged to stop the said yielding mold block in its normal position with its upper surface in the same plane as that of the stationary work table, a reciprocating conveyer mounted on said stationary work table and adapted to feed material to a mold in said yielding mold block, a lower die protruding into a mold in said yielding mold block, a cross head on which said lower die is mounted, resilient supports interposed between said cross head and the yielding mold block and tending constantly to return the latter to its normal position after depression, an extractor plunger connected with said cross head, means for actuating said extractor plunger by fluid pressure, lower stop rests arranged to support said cross head in its lowest position consisting of nuts engaging screw supports and formed with peripheral sprocket teeth, said supporting screws, an endless sprocket chain engaging the sprocket teeth on said rest nuts, upper stop rests arranged to limit the upward thrust of the cross head when the face of the lower die is in the same plane as that of the stationary work table and of the yielding mold block when the latter is in its normal position, an upper die plate and plunger, and means for operating the same by fluid pressure, for the purpose described.

9. In a press for molding plastic material, the combination of a stationary work table, a yielding mold block positioned therein, rests on the stationary work table arranged to stop the said yielding mold block in its normal position with its upper surface in the same plane as that of the stationary work table, a reciprocating conveyer mounted on said stationary work table and adapted to feed material to a mold in said yielding mold block, a thrust lever connected with said conveyer, a cam adapted to actuate said thrust lever, a lower die protruding into a mold in said yielding mold block, a cross head on which said lower die is mounted, resilient supports interposed between said cross head and the yielding mold block and tending constantly to return the latter to its normal position after depression, an extractor plunger connected with said cross head, means for actuating said extractor plunger by fluid pressure, lower stop rests arranged to support said cross head in its lowest position consisting of nuts engaging screw supports and formed with peripheral sprocket teeth, said supporting screws, a sprocket chain engaging the sprocket teeth on said rest nuts, upper stop rests arranged to limit the upward thrust of the cross head when the face of the lower die is in the same plane as that of the stationary work table and of the yielding mold block when the latter is in its normal position, an upper die plate and plunger, and means for operating the same by fluid pressure, for the purpose described.

WILLIAM B. UPDEGRAFF.

Witnesses:
   Geo. Wm. Miatt,
   Lillia Miatt.